B. M. HANNA.
MANUFACTURE OF GLASS ARTICLES.
APPLICATION FILED DEC. 23, 1913.
1,103,961.
Patented July 21, 1914.
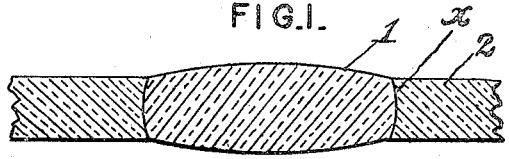
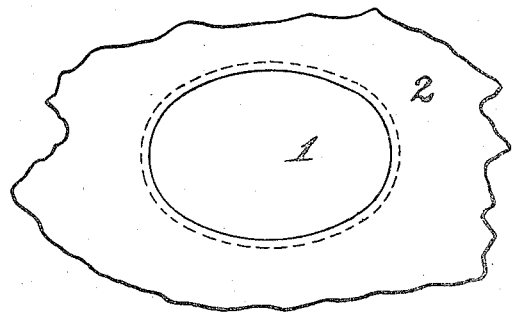
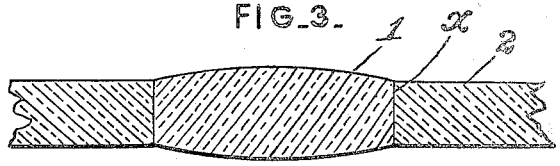
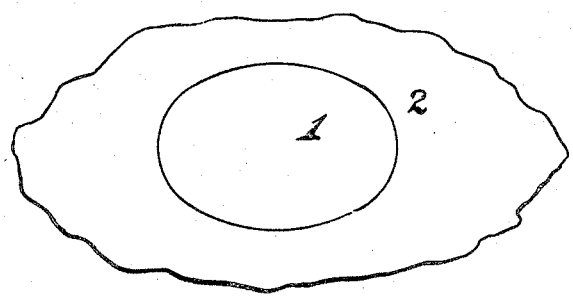
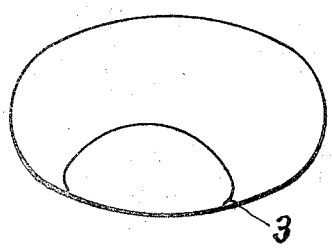
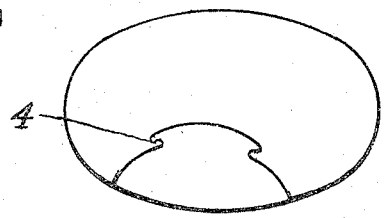
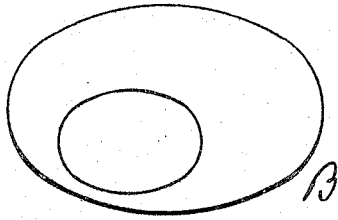
WITNESSES:
INVENTOR
Benjamin M. Hanna
by Christy and Christy
Att'ys

UNITED STATES PATENT OFFICE.

BENJAMIN M. HANNA, OF PITTSBURGH, PENNSYLVANIA.

MANUFACTURE OF GLASS ARTICLES.

1,103,961. Specification of Letters Patent. Patented July 21, 1914.

Application filed December 23, 1913. Serial No. 808,497.

*To all whom it may concern:*

Be it known that I, BENJAMIN M. HANNA, residing at Pittsburgh, in the county of Allegheny and State of Pennsylvania, a citizen of the United States, have invented or discovered certain new and useful Improvements in the Manufacture of Glass Articles, of which improvement the following is a specification.

My invention relates to compound glass articles and consists in a method of uniting the components. It has practical application in the making of bi-focal lenses, and, while in broadest terms, my invention is not limited to lens-making, nor even to the field of optical instruments, I shall describe my invention in its application thereto.

In the accompanying drawings, which illustrate the invention, Figures 1 and 2 show in section and in plan two bodies of glass united according to my invention; Figs. 3 and 4 are like views illustrating a variation in detail; Figs. 5 and 6 show in section and plan a bi-focal spectacle lens made according to my improved method; while Figs. 7 and 8 show in plan variations in detail upon the showing of Fig. 6.

The first four figures are diagrammatic. In them a body of glass 1 is applied to and secured in another body of glass 2 by the application of the principle of thermal expansion. Ordinarily the union of two bodies of glass involves either the complete or localized fusion of the components, or the use of cement. The fusion of the parts of optical glasses when once they have been ground is destructive of or tends to the destruction of the shape which has been most exactly and laboriously produced; and the use of cement is objectionable, when applied over lens surfaces, because of its deterioration optically in course of time. But, according to my invention, the components, one of which is to inclose wholly or in part the other, are most carefully ground and shaped and are then subjected to different degrees of temperature, the inclosing body being brought to relatively high, and the inclosed body to relatively low temperature. It will be understood that artificial application of heat or cold may be made to one or both bodies, separately or together. When so prepared, the components are brought together and allowed to come to uniform temperature, with the result that the inclosing body by its relative contraction will engage and securely hold the inclosed body. This mode of procedure is cheap and simple and does not require that an optician carry a large assortment of variously shaped lens-parts.

In Figs. 1 and 3 the bodies engage one another along an edge $x$; this edge may be rounded in convex or concave curvature. In Fig. 1 there is a concavity, and this concavity tends to greater security of union. The edge may if desired be straight, as in Fig. 3, in case the specific increments of expansion and contraction of the particular qualities of glass employed are such as to afford in this manner a union of sufficient security.

The practice of my invention does not, it will be understood, exclude the employment of cement or of other filling material also as an additional means of security, and if the application of cement or other material be confined to the edges of a lens its alteration through time can have no great effect upon the optical qualities of the instrument; furthermore, the presence of such material in the seam may be desirable as a seal, to prevent ingress of moisture or dust to space between lens surfaces, or to any sealed spaces.

Figs. 2 and 4 show the inserted body to be of oval form; the form is unimportant; but it will be noted that if the form be non-circular, the turning of the inserted body with relation to the matrix body is more effectively guarded against, and this is an important consideration, in optical work.

Figs. 5–8 inclusive show the invention in its application to bi-focal spectacle lenses. Figs. 5 and 6 will be fully understood from what has gone before; the presence of a cement over the lens surfaces which are brought together is rendered unnecessary. If the inserted lens is to extend to the margin of the glass, as shown in Fig. 7, its security may be assured by shaping the matrix-body with overhanging lips 3, to partially inclose the inserted body, or serrations may be formed elsewhere as indicated at 4 in Fig. 8. In each case the inserted body or a part of it is wholly or partially inclosed and held against separation when once the two bodies have been united according to the method of thermal expansion already indicated. It remains to be noted of Figs. 7 and 8 (and also of an insert of the plan shown in Fig. 6) that in each case the orifice may extend all the way through the matrix body (as indicated in Fig. 1) or may constitute a cavity in the matrix body (as indicated in Fig. 5). In case the insert lies in a cavity not extending through the matrix body (as Fig. 5) it will be understood that the opposing surfaces of two lens parts 1 and 2 need not be shaped to conformity one to the other (as is usual when the components of the glass are cemented face to face) if, for other reasons, non-conformity should be desired. This is consequent upon the fact that the holding of the insert is, according to my invention, not due to the cementing of the parts face to face but to that engagement along the edge of the insert which has already been described.

While I have described a method which permits of uniting previously shaped parts, it will be understood that the practice of my method does not forbid grinding or otherwise shaping the composite body after it has been put together according to my improved method.

It will be understood that the method is in no sense confined to use with glass of any specific quality or components of specific qualities, but that in the matter of index of refraction (for example) the invention is quite independent of any particularity in that regard.

My use of the term glass in this specification and in the appended claims is not intended to be a scientific definition of a product of the arts, but is rather used in a generic sense, and I intend it to be inclusive of material such as quartz for instance. And manifestly the invention is applicable to material of desired optical properties whatever its source and nature in other respects which has certain physical characteristics—that is to say, the property of expanding and contracting under varying temperature.

I claim as my invention:

1. The method herein described of uniting two bodies of glass in solid state which consists in forming in one body a recess to receive the other, bringing the two bodies to different degrees of temperature, applying the second body to the recess formed in the first when the two bodies are at such different temperatures, and then allowing them to come to uniform temperature.

2. The method of making bi-focal lenses which consists in grinding the lens parts and forming in one lens part an orifice for receiving the other lens part, bringing the two parts to different degrees of temperature and then inserting one part in the orifice formed for it in the other lens part, and allowing the parts so brought together to come to uniform temperature.

3. The method of making a bi-focal lens which consists in forming in one lens part a recess extending part way through the depth of the lens and shaped to receive the other lens part, bringing the two parts to different degrees of temperature, applying a sealing substance to the edge of the part second named and inserting it in the recess formed for it in the lens part first named, and then allowing the united lens to come to uniform temperature.

In testimony whereof I have hereunto set my hand.

BENJAMIN M. HANNA.

Witnesses:
FRANCIS J. TOMASSON,
BAYARD H. CHRISTY.